United States Patent
Montcalm et al.

(10) Patent No.: US 11,032,092 B2
(45) Date of Patent: Jun. 8, 2021

(54) SYSTEM AND METHOD FOR RECORDING AND REVIEWING MIXED-MEDIA COMMUNICATIONS

(71) Applicant: Mitel Networks Corporation, Ottawa (CA)

(72) Inventors: Michael Ross Montcalm, Ottawa (CA); Justin Ghantous, Stittsville (CA); Jonathan Braganza, Ottawa (CA)

(73) Assignee: Mitel Networks Corporation, Kanata (CA)

( * ) Notice: Subject to any disclaimer, the term of this patent is extended or adjusted under 35 U.S.C. 154(b) by 231 days.

(21) Appl. No.: 16/013,703

(22) Filed: Jun. 20, 2018

(65) Prior Publication Data

US 2019/0394058 A1    Dec. 26, 2019

(51) Int. Cl.
*H04L 12/18* (2006.01)
*H04L 12/58* (2006.01)
*H04M 3/42* (2006.01)

(52) U.S. Cl.
CPC .......... *H04L 12/1831* (2013.01); *H04L 51/36* (2013.01); *H04M 3/42221* (2013.01)

(58) Field of Classification Search
None
See application file for complete search history.

(56) References Cited

U.S. PATENT DOCUMENTS

| | | | | |
|---|---|---|---|---|
| 5,163,081 A * | 11/1992 | Wycherley | ........ | H04M 3/42391 379/265.02 |
| 8,724,795 B1 * | 5/2014 | Aldrich | .................... | H04M 3/51 379/265.02 |
| 9,014,358 B2 * | 4/2015 | Garcia | ..................... | G10L 15/26 379/202.01 |
| 9,628,358 B2 * | 4/2017 | Baillargeon | ............ | H04L 43/08 |
| 2003/0187650 A1 * | 10/2003 | Moore | ................ | H04M 7/0045 704/260 |
| 2007/0133780 A1 * | 6/2007 | Berner | ................ | H04M 3/5166 379/265.01 |
| 2008/0095325 A1 * | 4/2008 | Chilton | ............... | H04M 3/5232 379/1.01 |
| 2010/0235748 A1 * | 9/2010 | Johnson | .............. | H04M 1/6505 715/730 |
| 2013/0058471 A1 * | 3/2013 | Garcia | .............. | H04M 3/42221 379/202.01 |
| 2013/0282844 A1 * | 10/2013 | Logan | ..................... | H04L 67/02 709/206 |
| 2016/0253676 A1 | 9/2016 | Nyshadham | | |
| 2017/0134577 A1 | 5/2017 | Wold | | |
| 2017/0147576 A1 * | 5/2017 | Des Jardins | ............ | G06F 16/48 |
| 2017/0353408 A1 * | 12/2017 | Chen | ................... | H04L 67/2814 |

* cited by examiner

Primary Examiner — Davoud A Zand

(57) ABSTRACT

A method and system for transmitting, reviewing, and analyzing mixed-media communications are disclosed. The system includes one or more databases to store information in multiple formats. The information in multiple formats can be reviewed using a single application on a device for easy review and analysis of the mixed media communications.

19 Claims, 3 Drawing Sheets

SYSTEM AND METHOD FOR RECORDING AND REVIEWING MIXED-MEDIA COMMUNICATIONS

FIELD OF THE INVENTION

The present disclosure generally relates to electronic communication methods and systems. More particularly, the disclosure relates to electronic communication methods and systems for recording, linking and reviewing linked recorded communications.

BACKGROUND OF THE DISCLOSURE

Electronic communications, such as emails, text messages, chat sessions, social media posts, phone calls, video chats, and the like continue to become ever more prevalent with the advent of increasingly capable communication devices and systems. Various communication platforms, such as those used in customer support centers, often allow users (e.g., a customer and an agent) to communicate using more than one form of electronic communication—either during a communication or for multiple communications that may relate to the same topic. For example, in the context of a customer support center, a customer and an agent may communicate via a phone call for one session, using a chat session for another, using email for yet another, and the like.

Communications, such as phone calls, emails, chat sessions, and the like between users (e.g., a customer and an agent) are often recorded. The recorded communications can be used to, for example, create a record of the communication, evaluate an agent, assist the customer or other customers, and/or evaluate products or services. Typically, when multiple forms of electronic communications (emails, text messages, phone calls, etc.) are recorded, the recordings are stored in separate databases. While such systems can allow for some review of individual forms of electronic communications, such systems generally do not allow for convenient review of mixed-media communications involving more than one type of communication. Further, it may be difficult to determine relatedness of mixed-media communications across the multiple forms of recorded communications using typical communications systems. Accordingly, improved systems and methods for recording and reviewing mixed-media communications are desired.

Any discussion of problems provided in this section has been included in this disclosure solely for the purpose of providing a context for the present invention, and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure relate to electronic communication systems that allow a user to review mixed-media communications that are linked together. While the ways in which the present disclosure addresses various drawbacks of prior systems and methods are described in more detail below, in general, various systems and methods described herein link mixed-media communications using an identifier and present the linked information to a user to facilitate easy review and analysis of the linked information. Exemplary systems and methods can additionally perform keyword analysis and/or formatting of the linked information. By using an identifier to link the mixed-media information, information that originated in different forms or formats (e.g., text, audio, and/or video) can be accessed using a single application or client (both generally referred to herein as application) on a user device.

By way of examples, exemplary systems and methods can be used in customer support settings, wherein one or more agents can have multiple communications, in multiple formats, dealing with an issue. However, the present disclosure is not limited to such applications, unless otherwise noted.

Figure 1:
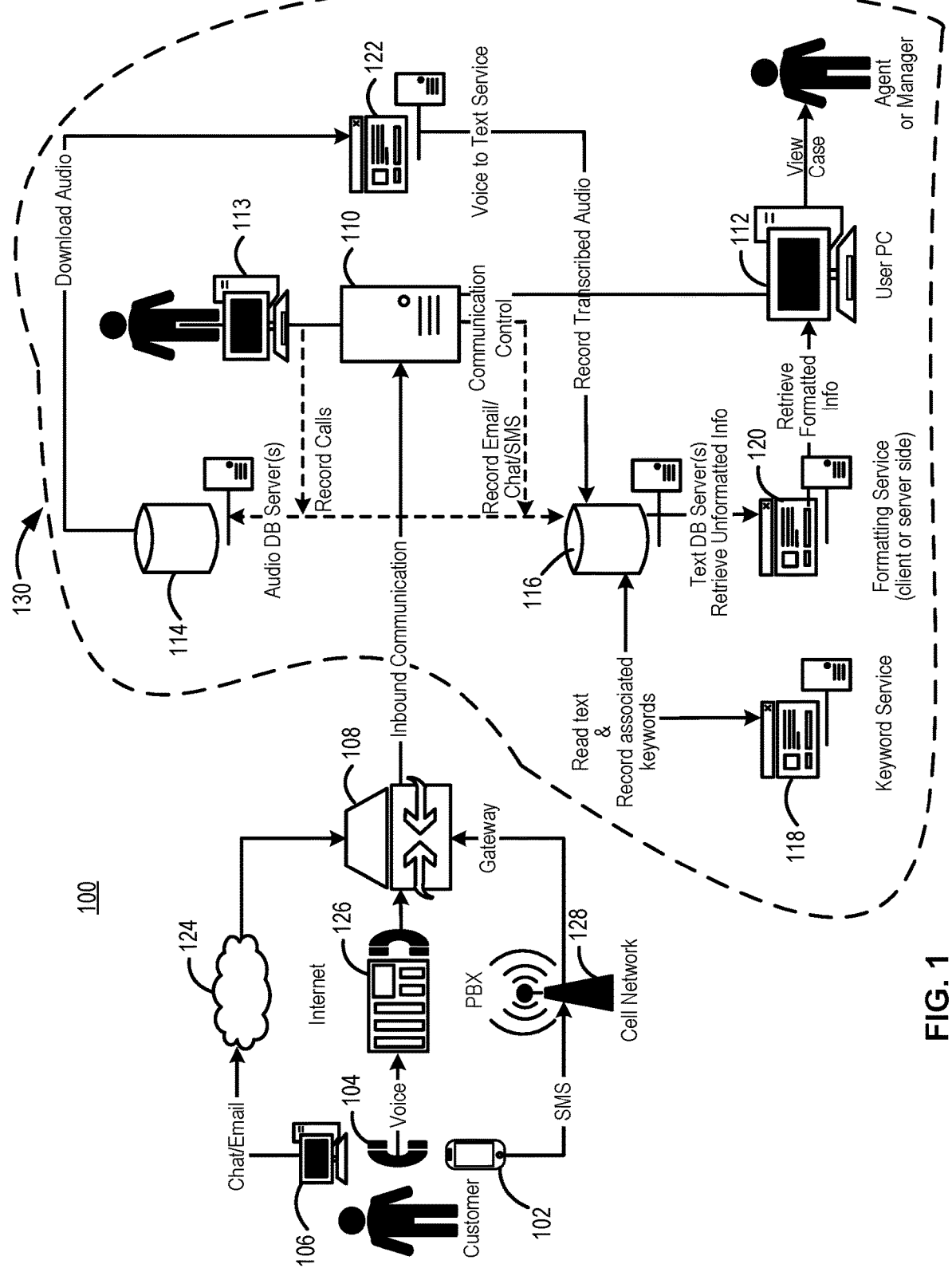
FIG. 1 illustrates a communication system in accordance with exemplary embodiments of the disclosure.

Turning now to the figures, FIG. 1 illustrates an electronic communication system 100 in accordance with exemplary embodiments of the disclosure. Electronic communication system 100 includes one or more first devices 102, 104, 106; a communication gateway 108 that receives a first communication from one or more of first user devices 102, 104, 106; a communication controller 110 that receives the first communication from communication gateway 108 and that routes the first communication to one or more second user devices 112, 113; and one or more databases 114, 116 configured to store information corresponding to the first communication and information corresponding to the second communication. In the illustrated example, system 100 also includes a keyword module, a formatting module 120, and a voice-to-text module 122. As used herein, "module" can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices).

System 100 can include one or more networks. In the illustrated example, communication controller 110, one or more second user devices 112, 113, audio server 114, text server 116, keyword module 118, formatting module 120, and voice-to-text module 122 can form part of a network 130.

System 100 can be used to link and present to a user (e.g., an agent or manager) mixed-media communications that are received from a customer using one or more of first devices 102, 104, 106. The mixed-media communications can originate from different types of devices and can originate in different forms or formats. System 100 can present the linked information to the agent or manager in a manner that is easy to review and interpret, and which facilitates faster resolution of issues presented in the mixed-media communications.

First devices 102, 104, 106 and second devices 112, 113 can be or include any suitable device with wired or wireless communication features that can connect to gateway 108. For example, first and second devices 102, 104, 106, 112, 113 can be or include a wearable device, a tablet computer, a wired phone, a mobile phone, a personal (e.g., laptop or desktop) computer, a streaming device, such as a game console or other media streaming device, or the like. One or more of first and second devices 102, 104, 106, 112, 113 can include an application to perform various functions set forth herein and/or to cause to be displayed text via a user interface and/or other information as described herein. For example, device 112 can include an application to cause to be displayed the linked information as described herein.

System 100 can include various networks and/or other routers to allow one or more first devices 102, 104, 106 to couple to gateway 108. For example, system 100 can include a network 124 to allow one or more devices 102, 104, 106 to communicate with gateway 108. Network 124 (and/or network 130) can be, for example, an internet protocol (IP) network. Exemplary types of networks suitable for communication network 124 include a local area network, a wide-area network, a metropolitan area network, wireless networks, or the Internet. Various components of network 124 can be coupled to one or more other components using an Ethernet connection, other wired connections, and/or wireless interfaces. Networks 124, 130 can be coupled to other networks and/or to other devices typically coupled to networks. By way of particular examples, network 124 can include the Internet and network 130 can include a communication network. Networks 124, 130 can be coupled to additional networks (not illustrated) that can be coupled to one or more of devices 102, 104, 106. Additionally or alternatively, system 100 can also include a private branch exchange (PBX) 126. PBX 126 can couple devices 102, 104, 106 to gateway 108 using Public Switched Telephone Network (PSTN) or can use internet protocol (IP) to couple devices 102, 104, 106 to gateway 108. Further, as illustrated, system 100 can additionally or alternatively include a cellular or mobile network 128 to allow one or more of devices 102, 104, 106 to couple to gateway 108.

Gateway 108 can include any suitable apparatus that allows data to flow from, for example, network 124, PBX 126 and/or cell network 128 to communication controller 110 within network 130. By way of example, gateway 108 includes the Mitel Border Gateway. Gateway 108, such as the Mitel Border Gateway, allows communication from outside of a customer site to the inside of the customer site. Although separately illustrated, gateway 108 could be a part of communication controller 110, or could be, for example, a MiVoice Business PBX set to forward communication to specific pilot/phone numbers to communication center 110.

Communication controller 110 can be or include, for example, a media gateway controller or Mitel MiContact Center that includes hardware and software to perform various functions of communication controller 110 as described herein. Communication controller 110, such as the Mitel MiContact Center, can include components to route inbound calls/emails/chats/etc. . . . depending on responses received by the IVR menus, text in the subject line, queues chosen by the user, and the like to route the call to the correct agent. In accordance with exemplary embodiments of the disclosure, communication controller 110 routes communications from one or more first devices 102, 104, 106 to one or more second devices 113. Communication controller 110 can also cause audio information from the communication to be stored in audio database 110 and/or text information associated with the communication to be stored in text database 116. For example, communications sent to specific ports of communication controller 110 can be given IVR workflows (menu trees) that allow a customer to route themselves with dual-tone multi-frequency signaling (DTMF) or voice prompts. Communication controller 110 can also poll an exchange or other email server for mail coming to a specific email address or address alias, and can route the information to the appropriate database based on, for example, sender, subject line, or the like information. As the various formats of the inbound communications are coming on separate ports of communication controller 110, and are of different data types (the packets of information identify what is being sent), communication controller 110 can select an appropriate route based on the data type it receives.

Although illustrated as one machine, communication controller 110 can include more than one machine. For example, the IVR and other functions can be located on one or more machines and the communication routing can be located on one or more other machines. Further, when communicating directly with another PBX, communication controller 110 can be or include a PBX.

Recording of audio is handled by splitting the inbound call at a border gateway of network 130, which can be the same or similar to gateway 108; or, one could do this at gateway 108 if gateway 108 is owned by the support provider, or by another gateway at the border of network 130. This third (audio) stream goes off to be recorded in audio database 114. The dotted line in FIG. 1 stemming from the inbound communication shows the separation of information flow. In the case of email, the email will go first to a mail server, located on the same or separate machine as communication controller 110, before the email or similar text is pulled into a contact center (e.g., of communication controller 110) to be routed to an agent.

The audio information and/or the text information is associated with an identifier (e.g., corresponding to one or more of a customer identification, a case identification, an issue identification, a keyword, or the like—generally anything that can be used to identify the communications), and the identifier is stored in association with a corresponding communication in one or more of audio database 114 and text database 116. An identifier can be created by, for example, using a database's unique key constraint. Each incoming communication to communication controller 110 is checked for an identifier, and if no identifier is found, one or more of audio database 114, text database 116, and controller 110 can assign a unique identifier associated with information corresponding to the communication. The identifier is used to link information in audio database 114 and text database 116 for review and/or analysis by, for example, one or more of an agent using second device 113 and/or an agent or manager using second device 112.

Communication controller 110 can be further configured to automatically cause any audio information (e.g., from audio and/or video calls) to be recorded in audio database in real time, using, e.g., MiVoice Call Recorder and any text information in a communication to be stored in database 116. For example, any audio and/or text information between one or more of first devices 102, 104, 106 and one or more second devices 113 can be automatically recorded in the respective databases as the communication is transferred through communication controller 110, and will be recorded with the associated unique identifier to link these communications to, for example, a specific case or issue. By way of example, a copy of all chats and emails and any other text medium can be written to a table in text database 116. This could be done by many different techniques (e.g., parsing the text, using a database that allows inserting email message objects or SMS objects as a type, and the like). The audio information can be recorded as discussed above.

Audio database 114 can include one or more servers to store audio information associated with one or more communications. The audio information can be stored in a digital audio file format, such as WAV, AIFF, AU, MPEG-4, Windows Media Audio (WMA) Lossless, MP3, AAC, WMA Lossy, or the like. Alternatively, raw or compressed audio information can be stored in another location (e.g., in the cloud or one or more file servers that may or may not form part of system 100). The audio information can be stored in association with an identifier as described herein. By way of example, audio database 114 can include file structure of audio files, with a SQL database of links to those files stored elsewhere—such as another server. In this case, all of the query-able data/metadata (length, the file's location, number dialed, number answering, user, agent, and the like) information is stored in audio database 114. To listen to the audio, one can query the link to the audio, which points to the file. This allows uniquely-named audio files that are not human readable in the file system to be easily found from a query.

In accordance with at least one embodiment of the disclosure, audio database 114 is configured to automatically send audio information and the corresponding identifier to voice-to-text module 122 for transcription of the audio information. Alternatively, communication controller 110 can automatically send audio information to voice-to-text module 122 for transcription. The transcription can then be associated with an identifier as described herein.

Text database 116 can include one or more servers to store text information associated with one or more communications. Text database 116 can store text information that originated as text (e.g., as part of an SMS message, email, or the like) and/or that originated as audio information (e.g., as part of an audio and/or video call) that is transcribed using, e.g., voice-to-text module 122. The text information is stored in association with an identifier as described herein.

Keyword module 118 can include suitable hardware and/or software to determine one or more keywords in a communication. Keywords can be created and/or selected by a user (e.g., customer, agent, manager, or the like) or automatically generated. A technique for automatically determining keywords has been developed by Stanford Core NLP (Natural Language Processing). For example, a list of keywords can be presented for selection by a user. Additionally or alternatively, keywords can be entered by a user (e.g., customer, agent, or manager)—e.g., either from a dropdown menu with a limited selection of keywords or can be typed by one of the users. One or more of the keywords determined and/or stored using keyword module 118 can be used as an identifier as described herein and/or can be used by second device 112 for searching information stored on text database 116.

In accordance with some examples of the disclosure, keywords can be used to reference initially unrelated (e.g., not linked) communications between, for example a user and an agent. For example, keywords from a separate conversation can be matched with the current conversation (linked information), allowing, for example, an agent to see that there might be another relevant thread to a discussion already underway or that happened in the past (archived conversation vs. another call/session happening simultaneously). Regardless, the keywords and the transcripts can be stored first using keyword module 118 and then used by, for example, a manager or agent.

Formatting module 120 can be standalone, form part of text database 128, and/or form part of second device 112. Formatting module 120 is configured to pull information linked via an identifier from audio database 114 and text database 116 and cause such information to be displayed on second device 112 and/or 113. Formatting module 120 retrieves all information associated with an identifier and causes to be displayed such information on second device 112 and/or 113.

Voice-to-text module 122 is configured to convert speech information stored in audio database 114 into text information and to cause such text information to be stored in text database 116. An exemplary voice-to-text module 122 includes, for example, Windows Speech Recognition, Google Docs Voice Typing, Dragon NaturallySpeaking, and the like.

Figure 2:
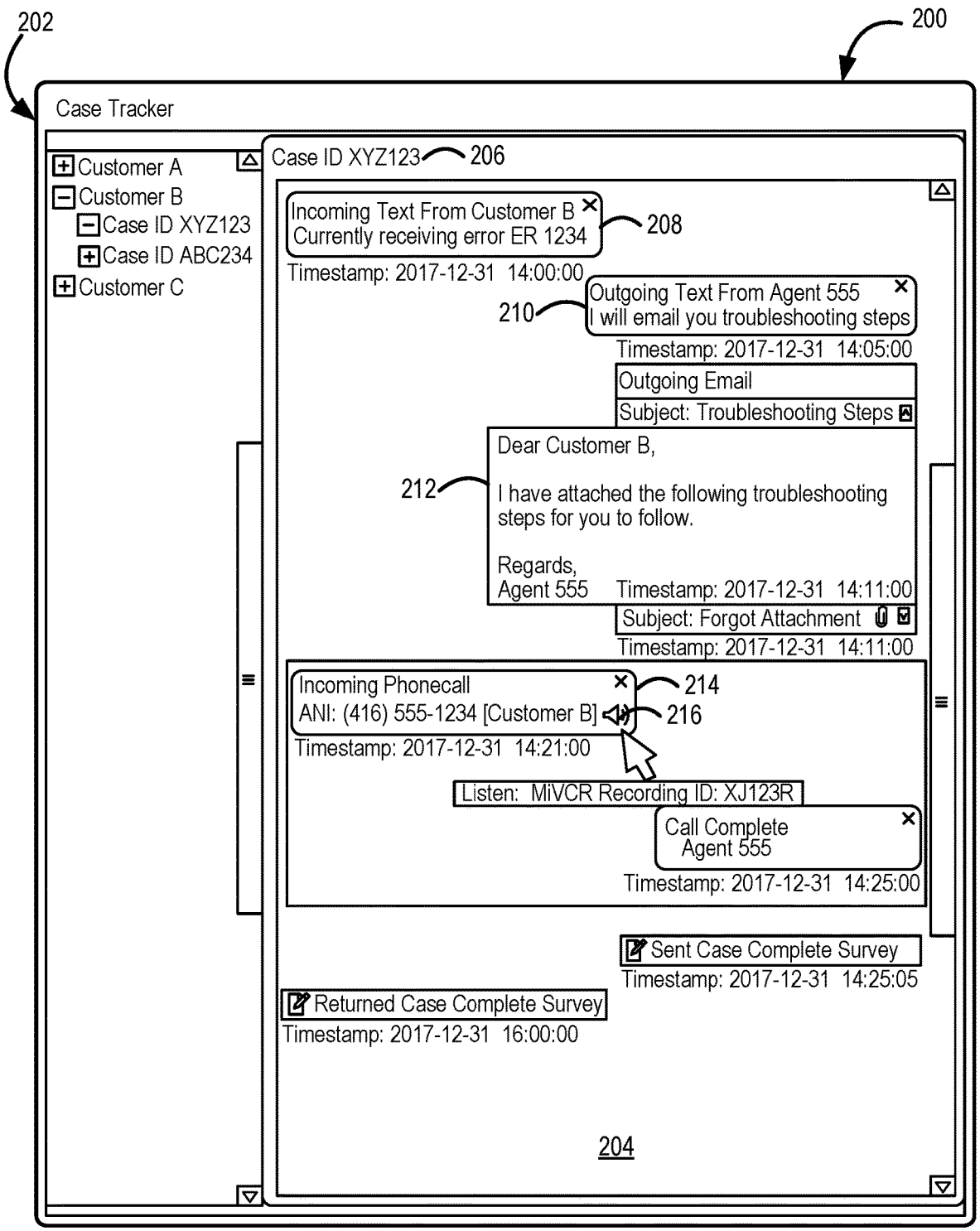
FIG. 2 illustrates a user interface in accordance with exemplary embodiments of the disclosure.

FIG. 2 illustrates an exemplary user interface 200 in accordance with at least one embodiment of the disclosure. User interface 200 can be displayed on, for example, second device 112 and/or 113. In the illustrated example, user interface 200 displays a list of customers 202. List of customers 202 can correspond to, for example, a list of customers associated with an agent and/or a manager. User interface 200 also include a dialog pane 204, which shows a history of communications for an identifier 206 (e.g., Case ID in FIG. 2). In the illustrated example, dialog pane 204 includes identifier 206 associated with a case or issue—e.g., a case of a user of one of devices 102, 104, 106, an outgoing message 210 sent—e.g., by a user of device 113, and messages 212, 214 that are linked to messages 204, 206 via identifier 206. Text portions of messages 208-214 can originate as audio information and can be transcribed—e.g., using voice-to-text module 122. In addition, the messages can include a link 216 to audio information that is linked with the identifier. A user (e.g., of second device 113) can select the link to listen to a linked audio communication associated with the identifier. This allows both text and audio information of communications linked by an identifier to be accessed and reviewed using a single user interface 200.

Figure 3:
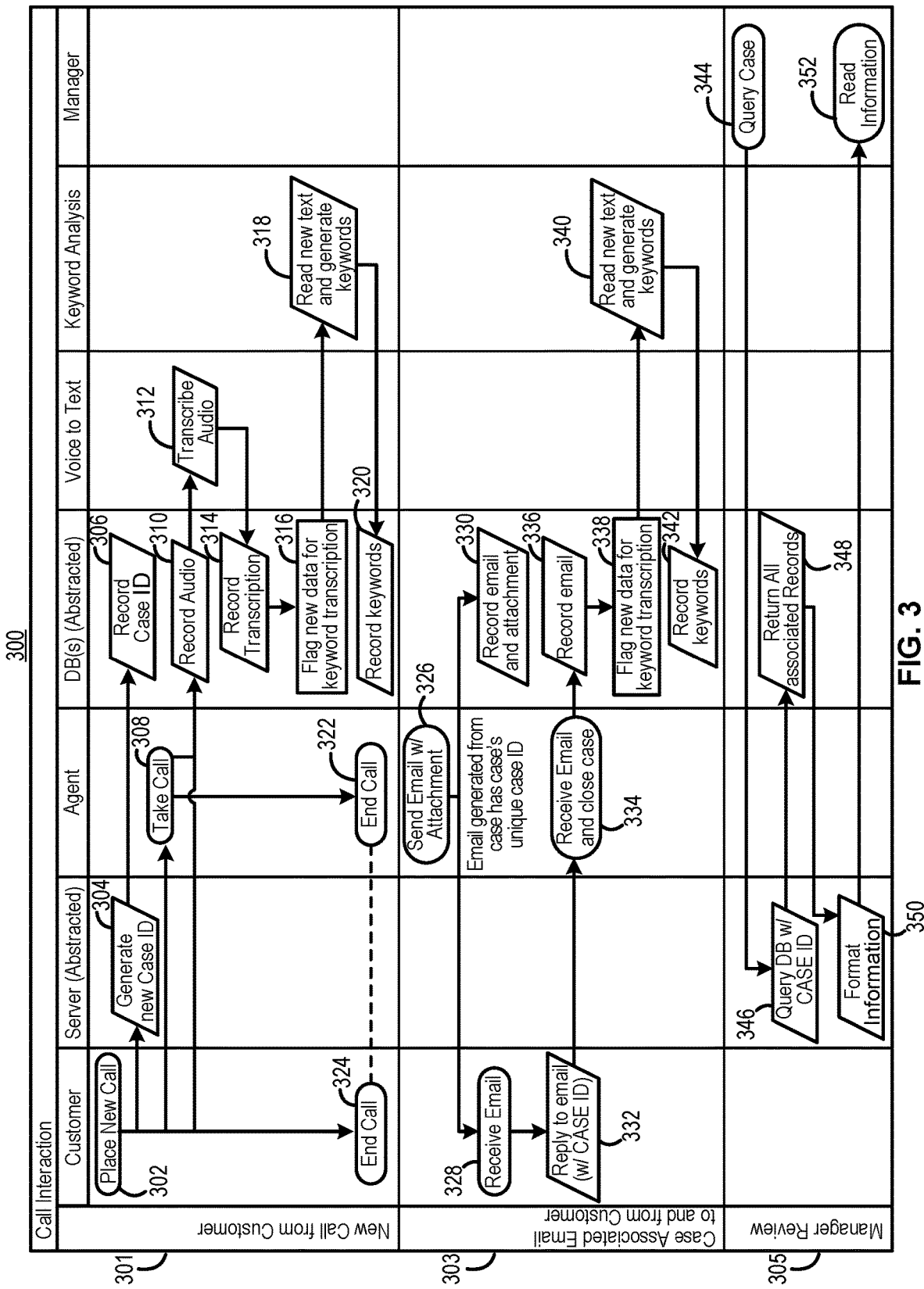
FIG. 3 illustrates a method in accordance with yet another exemplary embodiment of the disclosure.

FIG. 3 illustrates a method 300 in accordance with at least one additional embodiment of the disclosure. FIG. 3 illustrates three sections 301, 303, 305 of a communication. Section 301 corresponds to an initial communication, section 303 corresponds to a subsequent communication linked to the initial communication via an identifier, and section 305 corresponds to a review of the linked communications from sections 301, 303.

Section 301 of method 300 includes a step 302 of initiating a new communication—i.e., a communication that is not yet associated with an identifier—using, e.g., one of first devices 102, 104, 106. At step 304, a new identifier is created—e.g., using communication controller 110. At step 306, an identifier is recorded in a database—e.g., one or more of audio database 114 and text database 116. At step 308, an agent is connected to the communication—e.g., using communication controller 110 to connect to, for example second device 113. If the communication has an audio component, the communication controller 110 can cause the audio information to be stored in a database (e.g., audio database 114), step 310. The audio information can be transcribed using, e.g., voice-to-text module 122 at step 312. The transcribed information can then be stored in a text database (e.g., text database 116 at step 314. The text information stored in the text database can then be reviewed using, e.g., keyword module 118 to determine keywords associated with the communication (step 318) and the keywords can be recorded—e.g., with the text in text database 116 (step 320). The call can then end (steps 322, 324).

Section 303 begins with sending another communication (step 326). In the illustrated example, the communication of step 326 originates as text. The communication can be sent from a second device (e.g., second device 113) to a first device (e.g., first device 102, 104, 106) and recorded (e.g., in text database 116). In this case, a communication controller (e.g., communication controller 110) can forward the communication to the first device where the communication is received by the first device (step 328) and to the text database for recording of the text (step 330). If communication originated as audio in step 326, then the text could be transcribed, as described herein, prior to recording in the text database. At step 332, a user can reply to the email received on the first device (step 332), the second device can receive the communication (step 334), and the communication can be recorded (step 336). Keywords of the text of the communication recorded during step 336 can be determined during steps 338, 340, and the keywords can be recoded in association with the text of the communication (step 342).

During section 305, one or more communications associated with an identifier can be reviewed. Section 305 begins with step 344 of initiating a querying of a database (e.g., text database 116) using a second device (e.g., second device 112) by, for example, sending the query to communication controller 110 and querying one or more databases (e.g., a text database and audio database) for communication information associated with an identifier at step 346. The results are returned to a formatting module (step 348) and the results are formatted (step 350) for display on the second device (step 352)—e.g., using interface 200.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

We claim:

1. A system comprising:
a first user device;
a communication gateway that receives a first communication from the first user device;
a communication controller that receives the first communication from the communication gateway and that routes the first communication to a second user device; and
one or more databases configured to store information corresponding to the first communication and information corresponding to a second communication from the second user device to the first user device, wherein the information corresponding to the first communication is associated with a unique identifier and wherein the information corresponding to the second communication is associated with the unique identifier,
wherein the information corresponding to the first communication and the information corresponding to the second communication are linked within the one or more databases using the unique identifier to form linked information,
wherein a format of the first communication and a format of the second communication are different, the first communication and the second communication comprising mixed-media communications, and
wherein the second user device retrieves the linked information from the one or more databases using the unique identifier and comprises a user interface configured to display the linked information to a user.

2. The system of claim 1, wherein the system automatically records the first communication when the second device connects to the first communication.

3. The system of claim 1, wherein one of the first communication and the second communication comprises a text-based communication and the other of the first communication and the second communication comprises audio information and wherein the linked information comprises content of the text-based communication and a transcription of or a link to a recording of the audio information.

4. The system of claim 1, further comprising a formatting module that receives the linked information and configures the linked information for display on the second device.

5. The system of claim 1, further comprising a keyword module to determine keywords in one or more of the information corresponding to the first communication and the information corresponding to the second communication.

6. The system of claim 5, wherein the keyword module determines the keywords in the first communication before the communication is received by the second device.

7. The system of claim 1, wherein the identifier corresponds to one or more of a customer identification, a case identification, an issue identification, and a keyword.

8. The system of claim 1, wherein a keyword module causes keywords associated with the linked information to be stored in the one or more databases.

9. The system of claim 1, further comprising a voice-to-text module to convert audio information into one or more of the information corresponding to the first communication and the information corresponding to the second communication.

10. The system of claim 1, wherein the linked information comprises one or more transcribed audio recordings.

11. A method comprising the steps of:
initiating a first communication;
using a database's unique key constraint, creating an identifier associated with the first communication;
storing information associated with the first communication and the identifier;
initiating a second communication including associating the second communication with the first communication and with the identifier;
storing information associated with the second communication and the identifier; and
linking, via the identifier, the information associated with the first communication and the information associated with the second communication to form linked information, the first communication and the second communication comprising mixed-media communications,
wherein the linked information includes information that originated as audio information and that originated as text information.

12. The method of claim 11, further comprising a step of converting the audio information to text information.

13. The method of claim 11, further comprising a step of determining keywords in the information associated with the first communication.

14. The method of claim 13, further comprising a step of storing the keywords in one or more databases and a step of using the keywords to retrieve from the one or more databases and then display the linked information and information associated with a third communication not linked through the identifier to the first and second communications.

15. The method of claim 11, further comprising a step of determining keywords in the information associated with the second communication.

16. The method of claim 15, further comprising a step of storing the keywords in one or more databases and a step of using the keywords to retrieve using the keywords and then display the linked information and information associated with a third communication not linked through the identifier to the first and second communications.

17. The method of claim 11, further comprising the steps of querying one or more databases to retrieve the linked information associated with a keyword and presenting the linked information to a user.

18. The method of claim 11, further comprising the steps of querying one or more databases with the identifier to retrieve the linked information and presenting the linked information to a user, wherein the querying is performed after termination of both the first and second communications, whereby all communications associated with the identifier can be reviewed.

19. A system comprising:
a communication gateway that receives a first communication from a first user device;
a communication controller that receives the first communication from the communication gateway and that routes the first communication to a second user device;
one or more databases configured to store information corresponding to the first communication and information corresponding to a second communication from the second user device to the first user device, the first communication and the second communication comprising mixed-media communications; and
a keyword module to determine keywords in one or more of the information corresponding to the first communication and the information corresponding to the second communication,
wherein the information corresponding to the first communication and the information corresponding to the second communication are linked using an identifier to form linked information,
wherein a format of the first communication and a format of the second communication are different, and
wherein the second device retrieves the linked information using the identifier or retrieves the linked information and information associated with a third communication using the keywords and comprises a user interface configured to display at least one of the linked information and the linked information and the information associated with a third communication to a user.

* * * * *